(12) United States Patent
Raux et al.

(10) Patent No.: US 12,379,894 B1
(45) Date of Patent: Aug. 5, 2025

(54) REFERENCE RESOLUTION DURING NATURAL LANGUAGE PROCESSING

(71) Applicant: Apple Inc., Cupertino, CA (US)

(72) Inventors: Antoine R. Raux, Los Gatos, CA (US); Yi Ma, Milpitas, CA (US); Kevin D. Pitolin, Cupertino, CA (US); Felicia Edwards, Belmont, CA (US); Chengchao Yang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 17/677,936

(22) Filed: Feb. 22, 2022

Related U.S. Application Data

(60) Provisional application No. 63/227,120, filed on Jul. 29, 2021, provisional application No. 63/154,942, filed on Mar. 1, 2021.

(51) Int. Cl.
*G06F 3/16* (2006.01)
*G06F 3/01* (2006.01)
*G10L 15/22* (2006.01)

(52) U.S. Cl.
CPC .............. *G06F 3/167* (2013.01); *G06F 3/013* (2013.01); *G06F 3/017* (2013.01); *G10L 15/22* (2013.01); *G10L 2015/223* (2013.01); *G10L 2015/226* (2013.01)

(58) Field of Classification Search
CPC .......... G06F 3/167; G06F 3/013; G06F 3/017; G10L 15/22; G10L 2015/223; G10L 2015/226
See application file for complete search history.

(56) References Cited

U.S. PATENT DOCUMENTS

| | | |
|---|---|---|
| 7,475,010 B2 | 1/2009 | Chao |
| 7,818,215 B2 | 10/2010 | King et al. |
| 7,904,297 B2 | 3/2011 | Mirkovic et al. |
| 8,041,570 B2 | 10/2011 | Mirkovic et al. |
| 9,626,955 B2 | 4/2017 | Fleizach et al. |
| 9,633,004 B2 | 4/2017 | Giuli et al. |
| 9,633,660 B2 | 4/2017 | Haughay |

(Continued)

OTHER PUBLICATIONS

Coulouris et al., "Distributed Systems: Concepts and Design (Fifth Edition)", Addison-Wesley, May 7, 2011, 391 pages.

(Continued)

*Primary Examiner* — Darioush Agahi
(74) *Attorney, Agent, or Firm* — DLA Piper LLP (US)

(57) ABSTRACT

Systems and processes for operating a digital assistant are provided. An example method includes, at an electronic device having one or more processors and memory, detecting invocation of a digital assistant; determining, using a reference resolution service, a set of possible entities; receiving a user utterance including an ambiguous reference; determining based on the user utterance and the list of possible entities, a candidate interpretation including a preliminary set of entities corresponding to the ambiguous reference; determining, with the reference resolution service and based on the candidate interpretation including the preliminary set of entities corresponding to the ambiguous reference, an entity corresponding to the ambiguous reference; and performing, based on the candidate interpretation and the entity corresponding to the ambiguous reference, a task associated with the user utterance.

45 Claims, 8 Drawing Sheets

(56) References Cited

U.S. PATENT DOCUMENTS

| | | |
|---|---|---|
| 9,633,674 B2 | 4/2017 | Sinha |
| 9,668,121 B2 | 5/2017 | Naik et al. |
| 9,697,822 B1* | 7/2017 | Naik .................. G10L 15/22 |
| 9,721,566 B2 | 8/2017 | Newendorp et al. |
| 9,818,400 B2 | 11/2017 | Paulik et al. |
| 9,858,925 B2 | 1/2018 | Gruber et al. |
| 9,865,260 B1* | 1/2018 | Vuskovic ............ G10L 15/1815 |
| 9,886,953 B2 | 2/2018 | Lemay et al. |
| 9,922,642 B2 | 3/2018 | Pitschel et al. |
| 9,966,065 B2 | 5/2018 | Gruber et al. |
| 9,966,068 B2 | 5/2018 | Cash et al. |
| 9,986,419 B2 | 5/2018 | Naik et al. |
| 10,049,663 B2 | 8/2018 | Orr et al. |
| 10,049,668 B2 | 8/2018 | Huang et al. |
| 10,083,690 B2 | 9/2018 | Giuli et al. |
| 10,089,072 B2 | 10/2018 | Piersol et al. |
| 10,102,359 B2 | 10/2018 | Cheyer |
| 10,169,329 B2 | 1/2019 | Futrell et al. |
| 10,170,123 B2 | 1/2019 | Orr et al. |
| 10,185,542 B2 | 1/2019 | Carson et al. |
| 10,186,254 B2 | 1/2019 | Williams et al. |
| 10,192,552 B2 | 1/2019 | Raitio et al. |
| 10,223,066 B2 | 3/2019 | Martel et al. |
| 10,249,300 B2 | 4/2019 | Booker et al. |
| 10,269,345 B2 | 4/2019 | Castillo Sanchez et al. |
| 10,297,253 B2 | 5/2019 | Walker, II et al. |
| 10,311,871 B2 | 6/2019 | Newendorp et al. |
| 10,418,032 B1* | 9/2019 | Mohajer ............ G10L 15/1815 |
| 10,497,365 B2 | 12/2019 | Gruber et al. |
| 10,671,428 B2 | 6/2020 | Zeitlin |
| 10,706,841 B2 | 7/2020 | Gruber et al. |
| 10,791,176 B2 | 9/2020 | Phipps et al. |
| 10,854,206 B1* | 12/2020 | Liu .................... G06F 16/3344 |
| 10,978,090 B2 | 4/2021 | Binder et al. |
| 11,037,565 B2 | 6/2021 | Kudurshian et al. |
| 11,798,538 B1* | 10/2023 | Parker .................. G10L 15/183 |
| 11,854,040 B1* | 12/2023 | George .................. G10L 15/22 |
| 2013/0086056 A1* | 4/2013 | Dyor .................. G06F 16/9535 |
| | | 715/728 |
| 2013/0136253 A1* | 5/2013 | Liberman Ben-Ami ................ |
| | | H04M 3/5191 |
| | | 379/265.09 |
| 2015/0046260 A1* | 2/2015 | Engebretsen ...... G06Q 30/0256 |
| | | 705/14.54 |
| 2016/0077708 A1* | 3/2016 | Han .................... G06F 3/04842 |
| | | 715/846 |
| 2017/0169101 A1* | 6/2017 | Walia .................. G06Q 30/016 |
| 2017/0193998 A1* | 7/2017 | Sharifi .................. G10L 15/18 |
| 2017/0357637 A1* | 12/2017 | Nell ...................... G06F 3/167 |
| 2017/0371885 A1* | 12/2017 | Aggarwal ............ G06F 3/0484 |
| 2018/0373398 A1* | 12/2018 | Seixeiro ................ H04M 1/724 |
| 2019/0220247 A1* | 7/2019 | Lemay ................ G06F 16/9562 |
| 2019/0324779 A1* | 10/2019 | Martin .................. G06F 3/0481 |
| 2020/0322680 A1* | 10/2020 | Gupta ................ H04N 21/4316 |
| 2021/0118441 A1* | 4/2021 | Tanaka .................... G06F 3/167 |
| 2021/0142008 A1* | 5/2021 | Patra .................... G06F 40/237 |
| 2021/0233522 A1* | 7/2021 | Kikin-Gil ............ G10L 15/22 |
| 2023/0186911 A1* | 6/2023 | Sundram ................ G06F 3/167 |
| | | 704/275 |

OTHER PUBLICATIONS

Gupta, Naresh, "Inside Bluetooth Low Energy", Artech House, Mar. 1, 2013, 274 pages.

Navigli, Roberto, "Word Sense Disambiguation: A Survey", ACM Computing Surveys, vol. 41, No. 2, Article 10, Feb. 2009, 69 pages.

Phoenix Solutions, Inc., "Declaration of Christopher Schmandt Regarding the MIT Galaxy System", West Interactive Corp., Delaware Corporation, Document 40, Jul. 2, 2010, 162 pages.

Tur et al., "The CALO Meeting Assistant System", IEEE Transactions on Audio, Speech, and Language Processing, vol. 18, No. 6, Aug. 2010, pp. 1601-1611.

* cited by examiner

REFERENCE RESOLUTION DURING NATURAL LANGUAGE PROCESSING

RELATED APPLICATION

This application claims priority to U.S. Provisional Patent Application Ser. No. 63/227,120, filed Jul. 29, 2021, entitled "REFERENCE RESOLUTION DURING NATURAL LANGUAGE PROCESSING," and U.S. Provisional Patent Application Ser. No. 63/154,942, filed Mar. 1, 2021, entitled "REFERENCE RESOLUTION DURING NATURAL LANGUAGE PROCESSING," the content of which is incorporated by reference herein in its entirety for all purposes.

FIELD

This relates generally to digital assistants and, more specifically, to natural language processing with a digital assistant to resolve ambiguous references of spoken input.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user. In some cases, requests may be received that include ambiguous references and thus it may be desirable for the digital assistant to utilize natural language processing and available information to determine what the user intends to reference with the ambiguous term.

SUMMARY

Example methods are disclosed herein. An example method includes, at an electronic device having one or more processors and memory, detecting invocation of a digital assistant; determining, using a reference resolution service, a set of possible entities; receiving a user utterance including an ambiguous reference; determining based on the user utterance and the list of possible entities, a candidate interpretation including a preliminary set of entities corresponding to the ambiguous reference; determining, with the reference resolution service and based on the candidate interpretation including the preliminary set of entities corresponding to the ambiguous reference, an entity corresponding to the ambiguous reference; and performing, based on the candidate interpretation and the entity corresponding to the ambiguous reference, a task associated with the user utterance.

Example non-transitory computer-readable media are disclosed herein. An example non-transitory computer-readable storage medium stores one or more programs. The one or more programs include instruction for detecting invocation of a digital assistant; determining, using a reference resolution service, a set of possible entities; receiving a user utterance including an ambiguous reference; determining based on the user utterance and the list of possible entities, a candidate interpretation including a preliminary set of entities corresponding to the ambiguous reference; determining, with the reference resolution service and based on the candidate interpretation including the preliminary set of entities corresponding to the ambiguous reference, an entity corresponding to the ambiguous reference; and performing, based on the candidate interpretation and the entity corresponding to the ambiguous reference, a task associated with the user utterance.

Example electronic devices are disclosed herein. An example electronic device comprises one or more processors; a memory; and one or more programs, where the one or more programs are stored in the memory and configured to be executed by the one or more processors, the one or more programs including instructions for detecting invocation of a digital assistant; determining, using a reference resolution service, a set of possible entities; receiving a user utterance including an ambiguous reference; determining based on the user utterance and the list of possible entities, a candidate interpretation including a preliminary set of entities corresponding to the ambiguous reference; determining, with the reference resolution service and based on the candidate interpretation including the preliminary set of entities corresponding to the ambiguous reference, an entity corresponding to the ambiguous reference; and performing, based on the candidate interpretation and the entity corresponding to the ambiguous reference, a task associated with the user utterance.

An example electronic device comprises means for detecting invocation of a digital assistant; means for determining, using a reference resolution service, a set of possible entities; receiving a user utterance including an ambiguous reference; means for determining based on the user utterance and the list of possible entities, a candidate interpretation including a preliminary set of entities corresponding to the ambiguous reference; means for determining, with the reference resolution service and based on the candidate interpretation including the preliminary set of entities corresponding to the ambiguous reference, an entity corresponding to the ambiguous reference; and means for performing, based on the candidate interpretation and the entity corresponding to the ambiguous reference, a task associated with the user utterance.

Determining, with the reference resolution service and based on the candidate interpretation including the preliminary set of entities corresponding to the ambiguous reference, an entity corresponding to the ambiguous reference allows a digital assistant to determine what a user is referring to even when a received utterance is unclear. Accordingly, the digital assistant may more efficiently interact with a user by understanding even unclear commands with less clarification from the user. This allows the digital assistant to process the user commands without providing extraneous outputs and receiving other input reducing the power consumption of the digital assistant and improving the battery life of the electronic device.

DESCRIPTION

Figure 1A:
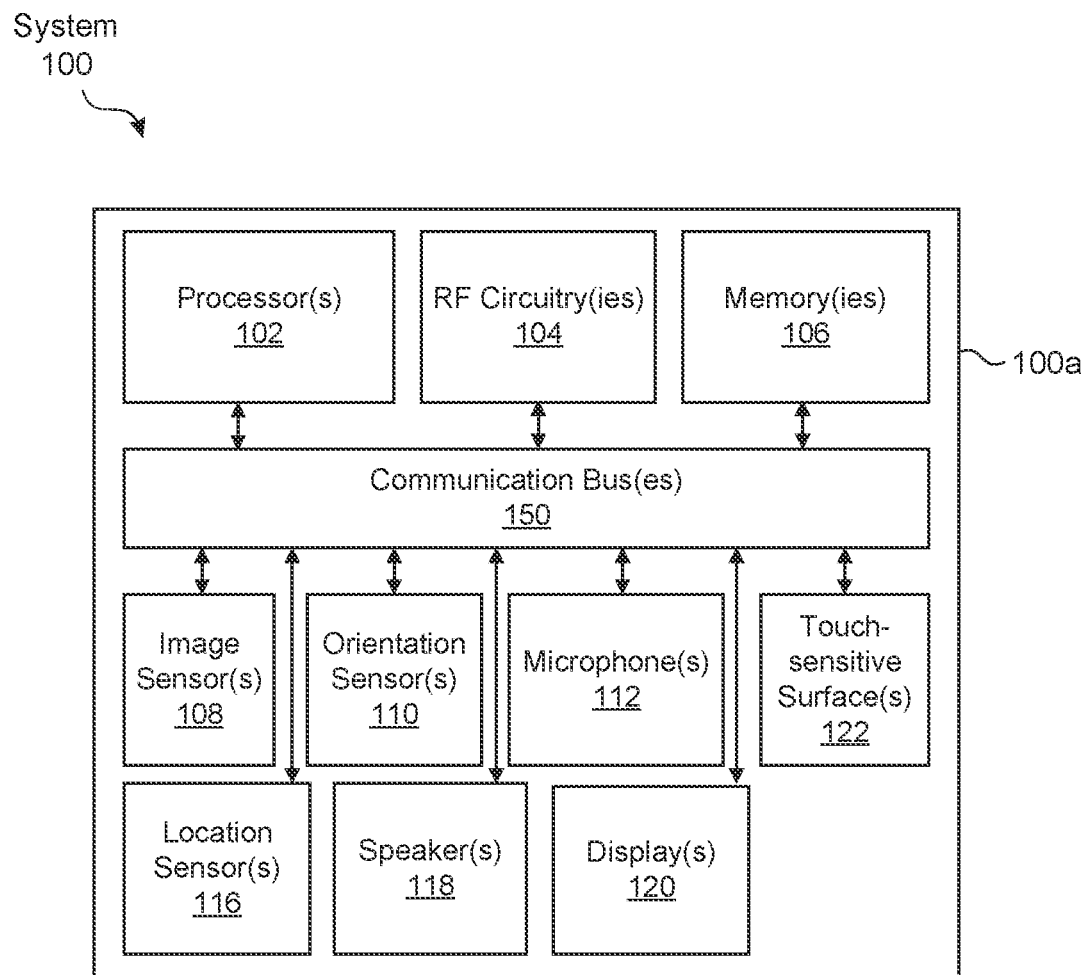
FIGS. 1A-1B depict exemplary systems for use in various computer-generated reality technologies, including virtual reality and mixed reality.

Various examples of electronic systems and techniques for using such systems in relation to various computer-generated reality technologies are described.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
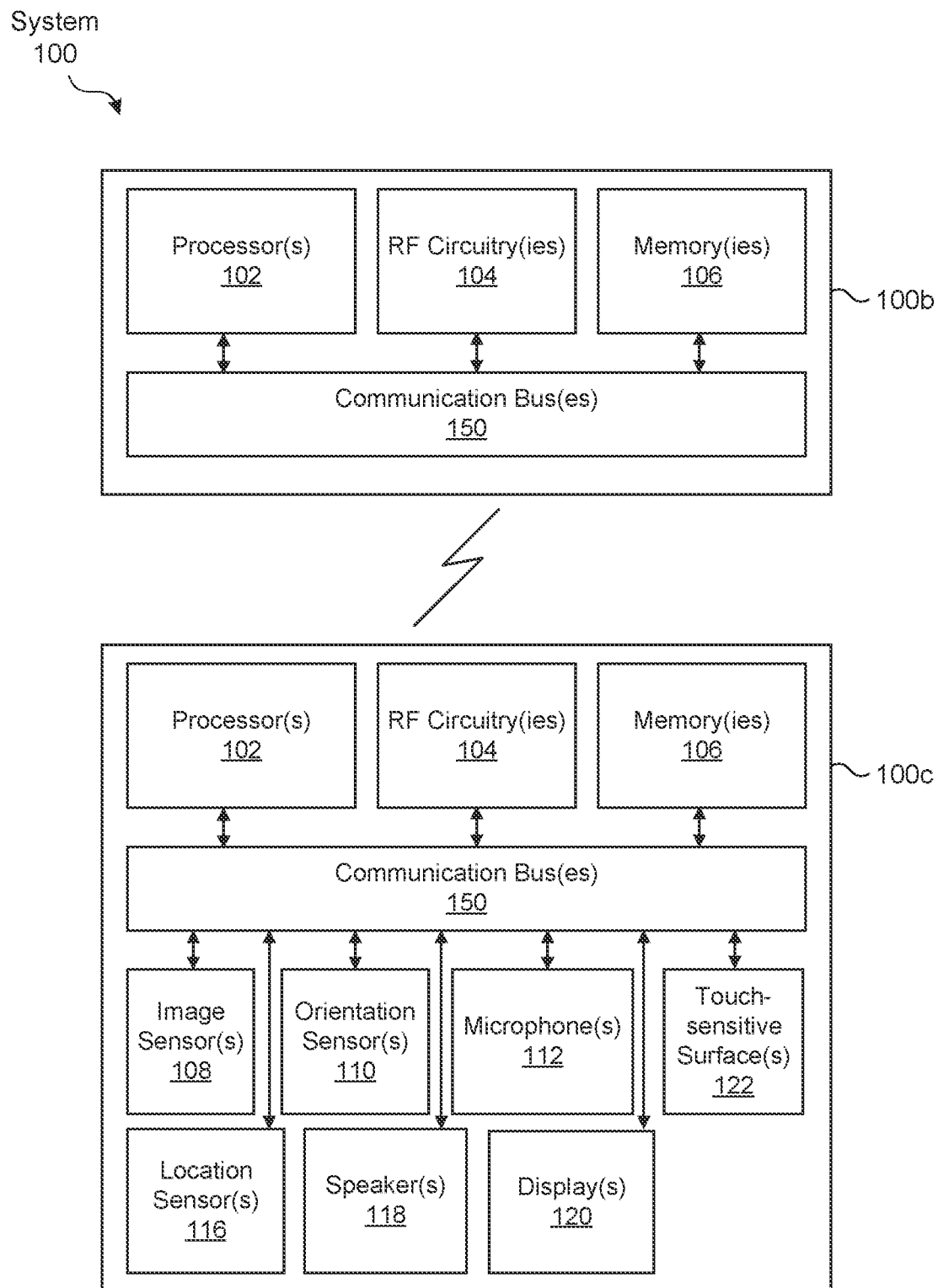

FIG. 1A and FIG. 1B depict exemplary system 100 for use in various computer-generated reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is a head-mounted display (HMD) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Figure 2:
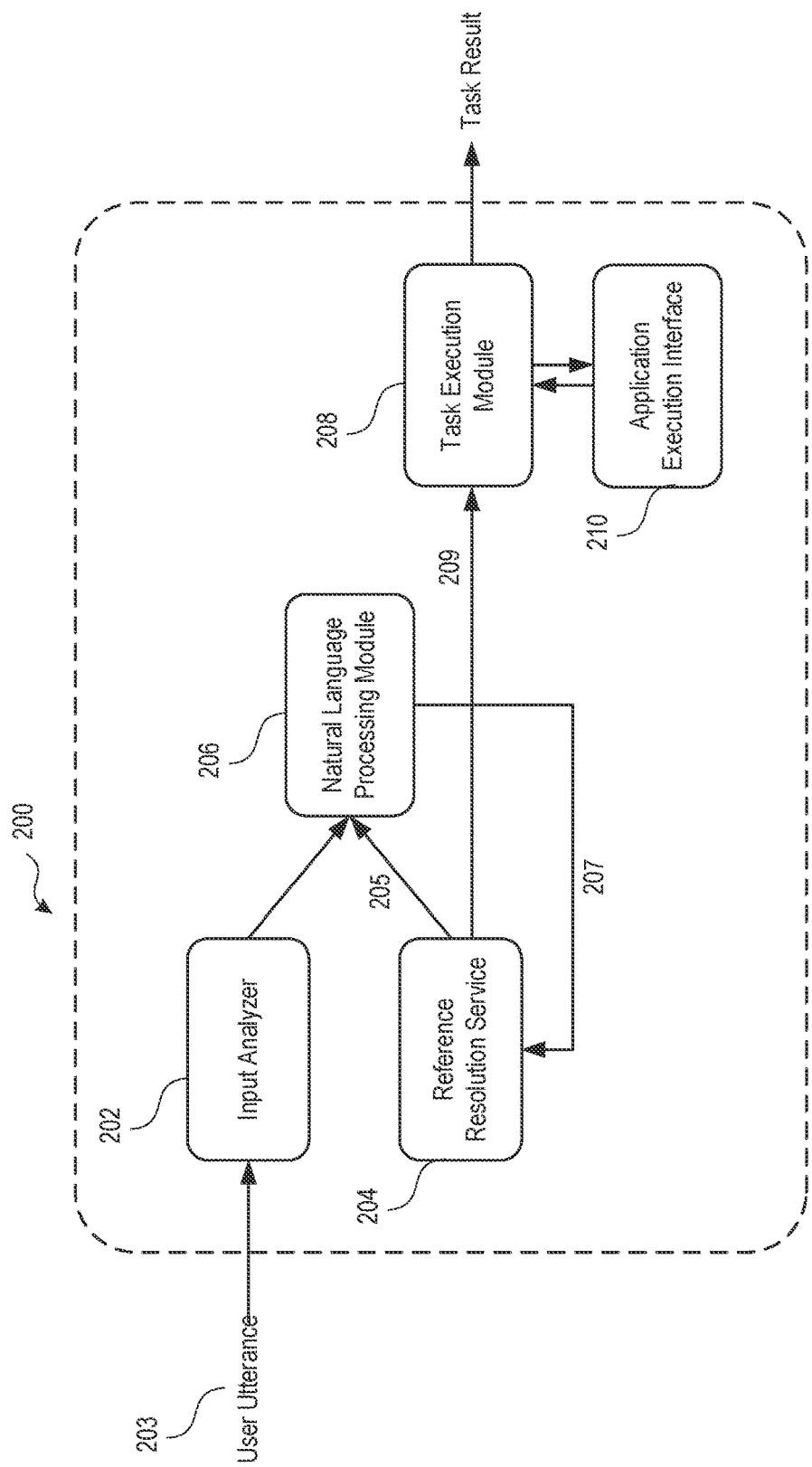
FIG. 2 depicts an exemplary digital assistant for resolving ambiguous references of user inputs, according to various examples.

FIG. 2 depicts exemplary digital assistant 200 for resolving ambiguous references of user inputs, according to various examples. In some examples, as illustrated in FIG. 2, digital assistant 200 includes input analyzer 202, reference resolution service 204, natural language processing module 206, task execution module 208 and application execution interface 210. In some examples, natural language processing module 206 and application execution interface 210 are optionally included in application 212. In some examples, these components or modules of digital assistant 200 may optionally be combined as discussed further below. In some examples, digital assistant 200 is implemented on electronic device 100. In some examples, digital assistant 200 is implemented across other devices (e.g., a server) in addition to electronic device 100. In some examples, some of the modules and functions of the digital assistant are divided into a server portion and a client portion, where the client portion resides on one or more user devices (e.g., electronic device 100) and communicates with the server portion through one or more networks.

It should be noted that digital assistant 200 is only one example of a digital assistant, and that digital assistant 200 can have more or fewer components than shown, can combine two or more components, or can have a different configuration or arrangement of the components. The various components shown in FIG. 2 are implemented in hardware, software instructions for execution by one or more processors, firmware, including one or more signal processing and/or application specific integrated circuits, or a combination thereof. In some examples, digital assistant 200 connects to one or more components and/or sensors of electronic device 100 as discussed further below.

Digital assistant 200 detects invocation of digital assistant 200 with input analyzer 202. In some examples, digital assistant 200 detects invocation based on a physical input on the electronic device. For example, digital assistant 200 may detect that a button on the electronic device (e.g., electronic device 100) is pressed or held for a predetermined amount of time.

Figure 3:
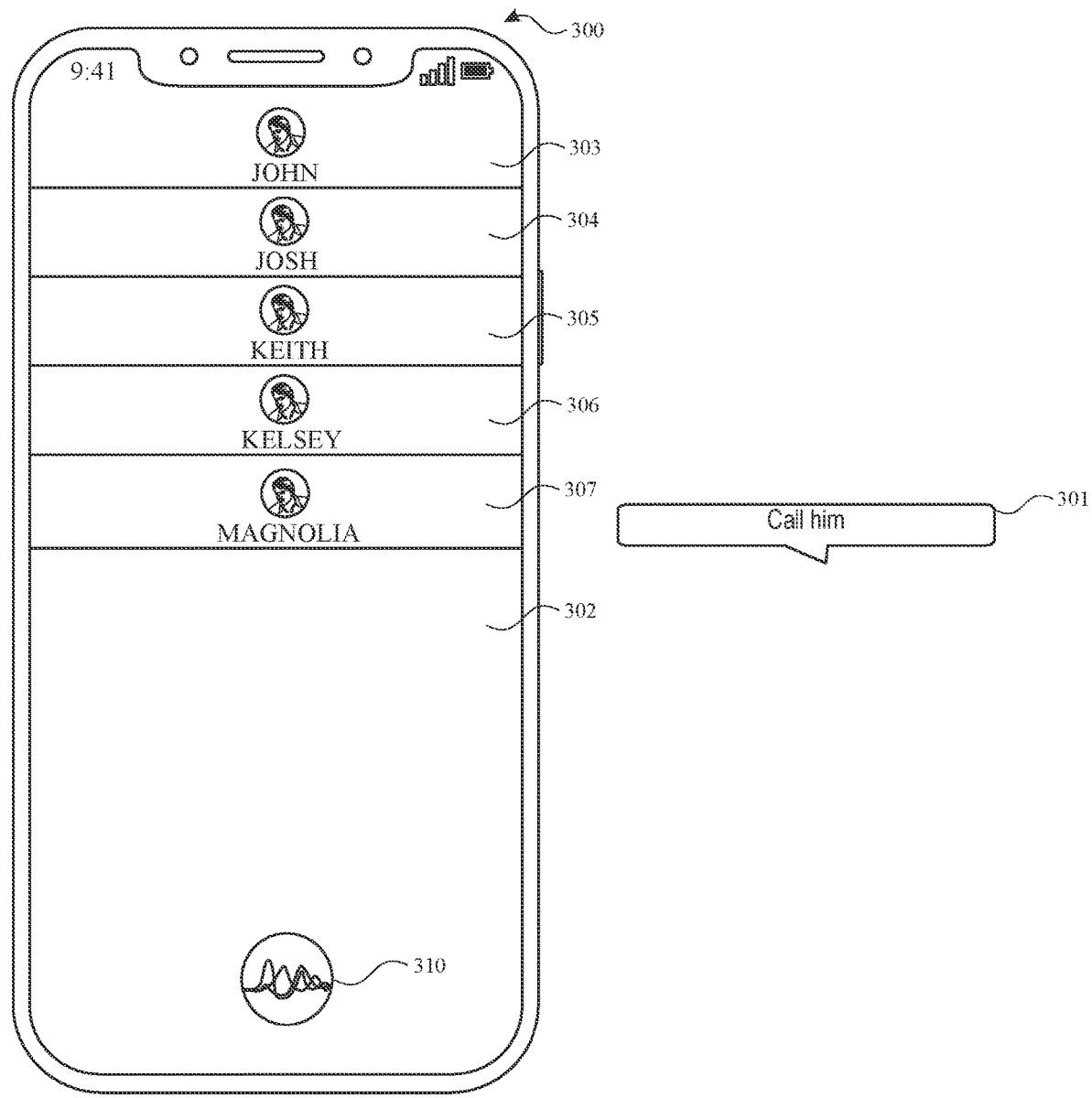
FIG. 3 depicts an exemplary electronic device and user utterance, according to various examples.
Figure 4:
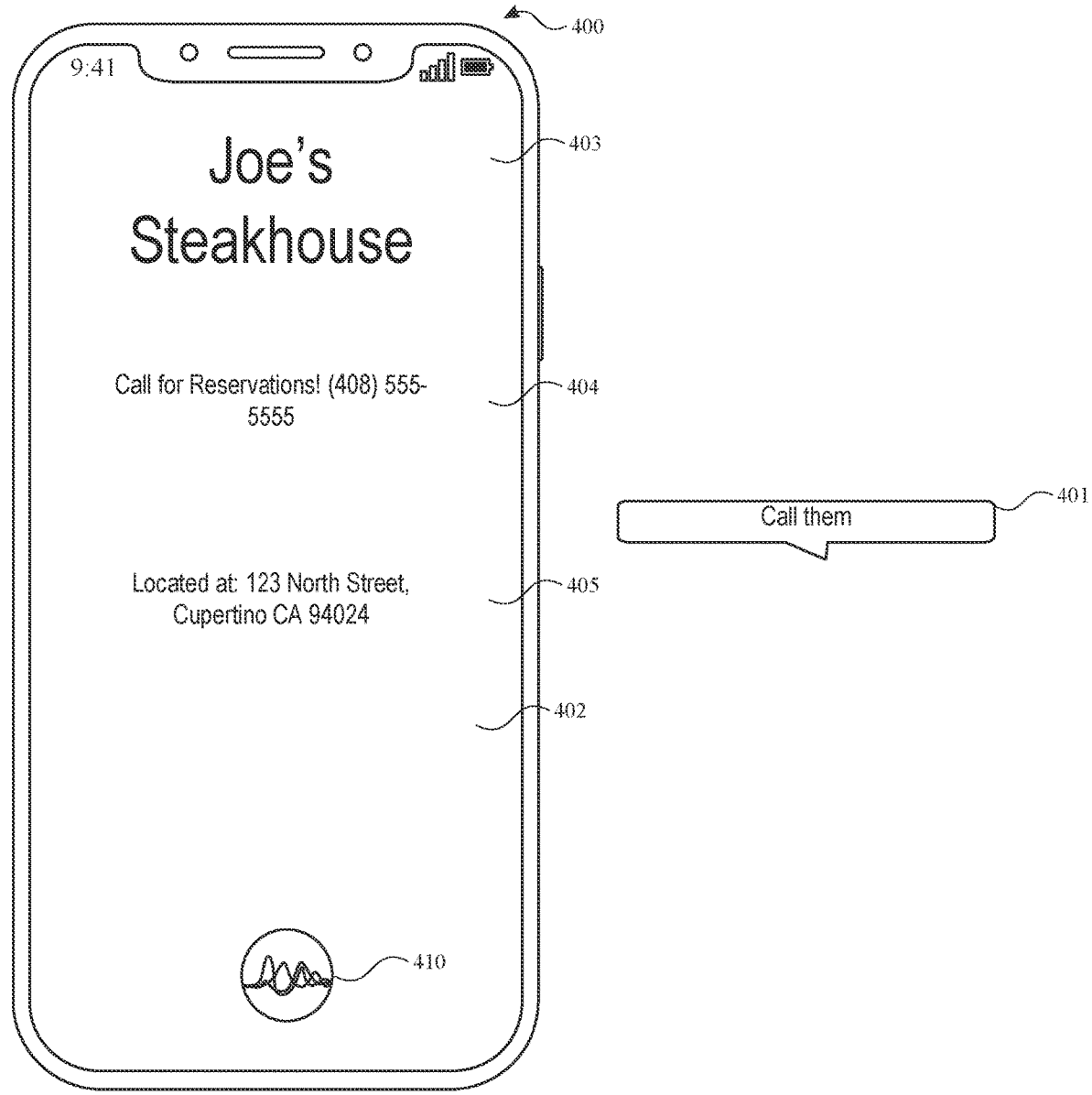
FIG. 4 depicts an exemplary electronic device and user utterance, according to various examples.
Figure 5:
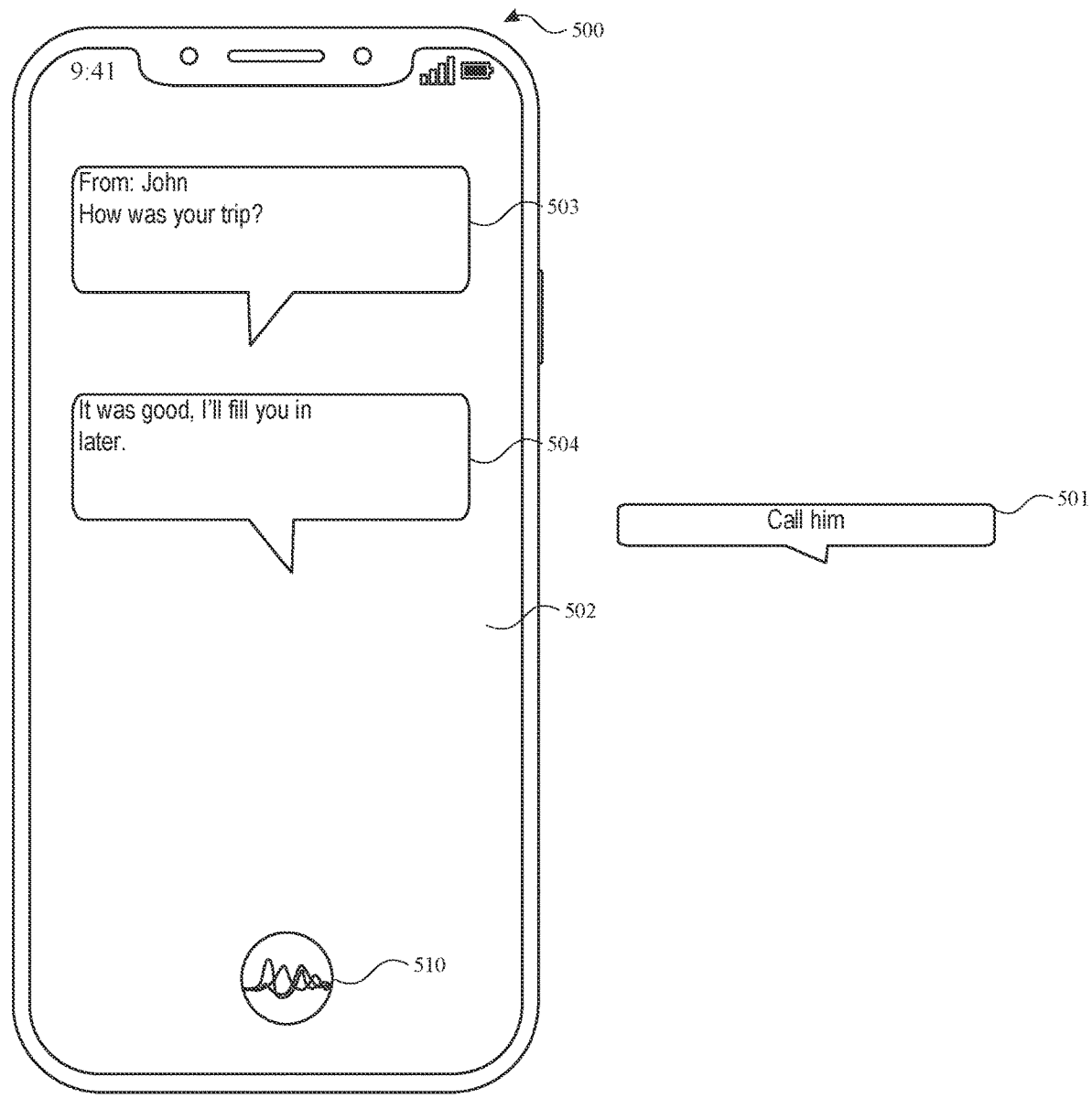
FIG. 5 depicts an exemplary electronic device and user utterance, according to various examples.
Figure 6:
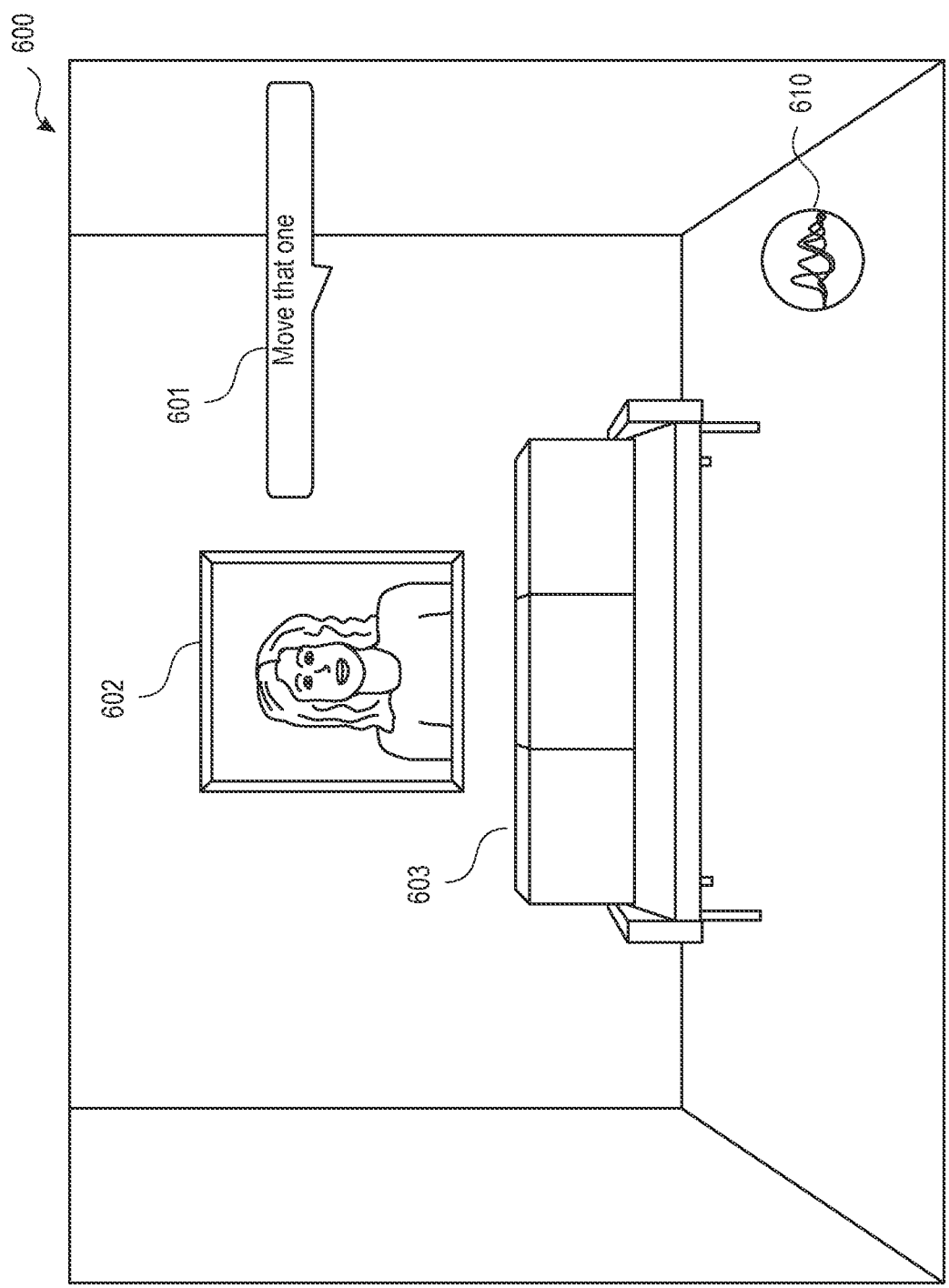
FIG. 6 depicts an exemplary electronic device and user utterance, according to various examples.
Figure 7:
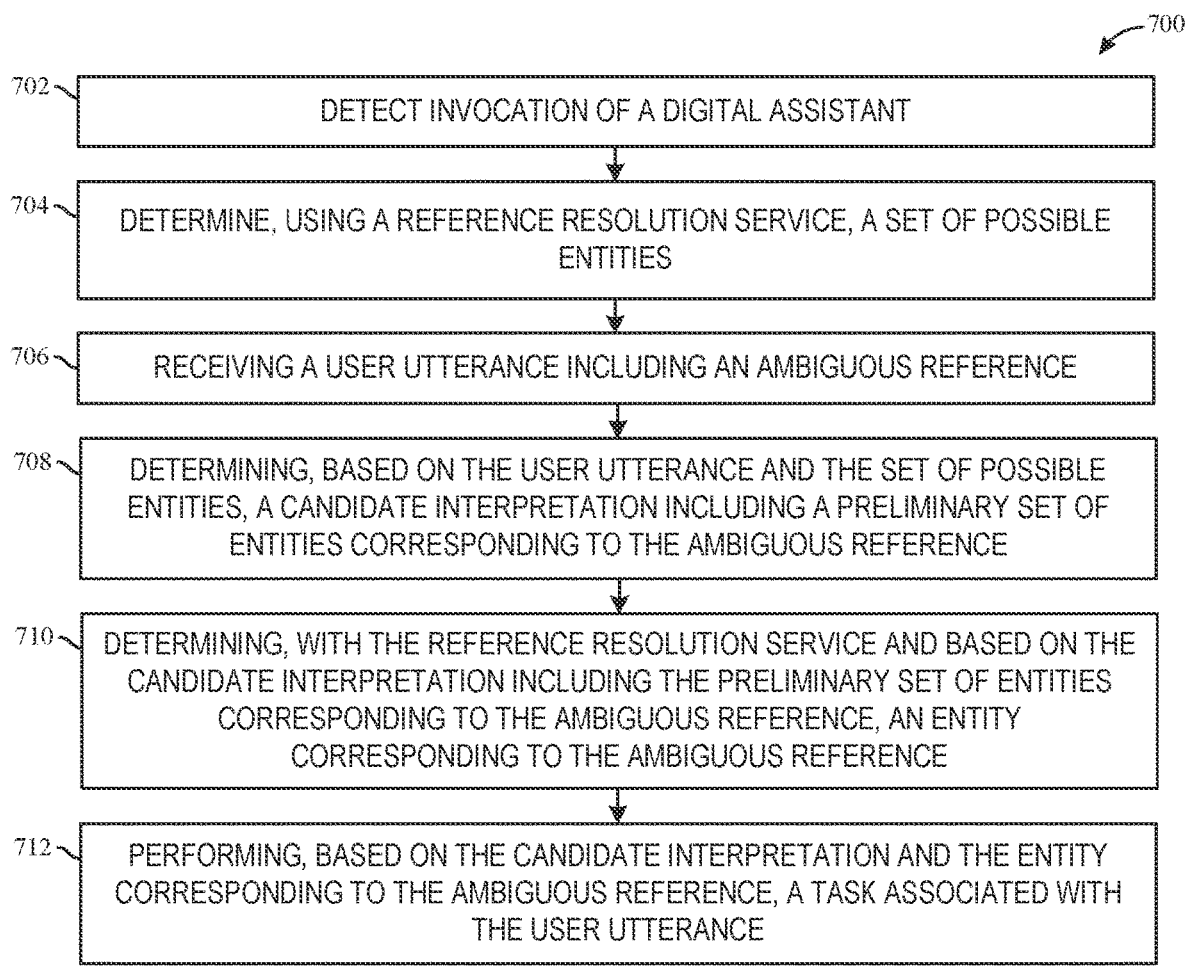
FIG. 7 is a flow diagram illustrating a method for resolving an ambiguous reference of a user utterance, according to various examples.

FIGS. 3, 4, 5, and 6 illustrate exemplary electronic devices 300, 400, 700, and 600 respectively, which include digital assistant 200 for resolving an ambiguous reference of a user utterance, according to various examples. FIG. 3 illustrates electronic device 300 including digital assistant 200 that receives user utterance 301 and performs a task corresponding to user utterance 301. FIG. 4 illustrates electronic device 400 including digital assistant 200 that receives user utterance 601 and performs a task corresponding to user utterance 601. FIG. 5 illustrates electronic device 700 including digital assistant 200 that receives user utterance 501 and performs a task corresponding to user utterance 501. FIG. 6 illustrates electronic device 600 including digital assistant 200 that receives user utterance 601 and performs a task corresponding to user utterance 601.

Each of FIGS. 3, 4, 5, and 6 will be discussed alongside digital assistant 200 below. FIGS. 3, 4, and 5 illustrates an electronic device such as a cell phone which may include a display screen 302, 602, or 702 for displaying various objects. FIG. 6 illustrates a view of an electronic device 600 such as a headset or other device capable of generating a virtual reality or augmented reality scene including virtual objects.

In some examples, digital assistant 200 detects invocation of digital assistant 200 based on a gaze of a user received by electronic device 100. For example, when electronic device 100 generates a virtual or augmented reality environment, electronic device 100 may determine that a user is looking at a virtual item indicative of digital assistant 200 and thus determine that digital assistant 200 has been invoked. In some examples, digital assistant 200 detects invocation of digital assistant 200 based on a gesture of the user received by electronic device 100. For example, electronic device 100 may determine that a user gestures (e.g., with a hand or head movement) towards a user interface indicative of digital assistant 200 and thus determine that digital assistant 200 has been invoked. In some examples, electronic device 100 detects the user gaze and/or gesture based on one or more sensors of electronic device 100 (e.g., image sensors 108, orientation sensors 110).

Digital assistant 200 may detect a user gaze or gesture based on the occurrence of a user gaze or gesture near in time to a user utterance 203. For example, the gestures or gaze may be detected at the same time as a user utterance 203, a short time before user utterance 203 (e.g., 2 seconds, 1 second, 10 milliseconds, 5 milliseconds, etc.) or a short time after user utterance 203 (e.g., 2 seconds, 1 second, 10 milliseconds, 5 milliseconds, etc.). In some examples, the gestures or gaze of the user may include a movement of electronic device 100 including moving a handheld electronic device in a particular direction, nodding while wearing an electronic device in a particular direction, or any other type of gesture.

In some examples, digital assistant 200 detects invocation based on a received audio input. In some examples, detecting invocation of digital assistant 200 includes determining whether an utterance of the received audio input includes a trigger phrase. For example, digital assistant 200 may receive a user utterance 203 including "Hey Siri" and determine that "Hey Siri" is a trigger phrase. Accordingly, digital assistant 200 may detect invocation based on the use of "Hey Siri." In some examples, detecting invocation of digital assistant 200 includes determining whether an utterance of the received audio input is directed to digital assistant 200.

In some examples, determining whether the utterance is directed to digital assistant 200 is based on factors such as the orientation of the electronic device (e.g., electronic device 300, 400, 700, or 600), the direction the user is facing, the gaze of the user, the volume of utterance 203, a signal to noise ratio associated with utterance 203, etc. For example, a user utterance 301 "call him" may be received when the user is looking at device 300. Accordingly, the orientation of electronic device 300 towards the user and the volume of utterance 301 may be indicative that the user is looking at electronic device 300. Thus, digital assistant 200 may determine that the user intended to direct utterance 301 to digital assistant 200.

In some examples, the received audio input includes a first user utterance and a second user utterance. In some example, detecting invocation of digital assistant 200 includes determining whether the first utterance of the received audio input is directed to digital assistant 200, as discussed above. In some examples, the second utterance of the received audio input includes an ambiguous reference, as discussed further below.

In some examples, after invocation of digital assistant 200 is detected, digital assistant 200 provides an indication that digital assistant 200 is active. In some examples, the indication that digital assistant 200 is active includes a user interface or affordance corresponding to digital assistant 200. For example, as shown in FIG. 3, affordance 310 corresponding to digital assistant 200 is displayed when digital assistant 200 is active. In some examples, the user interface corresponding to digital assistant 200 is a virtual object corresponding to digital assistant 200. For example, as shown in FIG. 4, virtual object 610 corresponding to digital assistant 200 is created by electronic device 600 and displayed in a view of electronic device 600.

Independently of the invocation of digital assistant 200, reference resolution service 204 determines a set of possible entities. In some examples, the set of possible entities includes an application displayed in a user interface of the electronic device. For example, when electronic device 300 is displaying a phone book or calling application as shown in FIG. 3, the set of possible entities includes the phone book or calling application. In some examples, the set of possible entities includes an application displayed as a virtual object by the electronic device. For example, electronic device 600 may display an application for watching a video as a virtual television in a view of electronic device 600. Accordingly, the set of possible entities includes the video or television application that corresponds to the virtual television.

In some examples, the set of possible entities includes information displayed on a screen of the electronic device. For example, when electronic device 400 is displaying a website as shown in FIG. 4, the set of possible entities includes information displayed on screen 402 of electronic device 400 such as name 403 of "Joe's Steakhouse," phone number 404, and address 405. It will be appreciated that these types of information or data are exemplary and that many different types of data could be extracted from a website or other application being displayed on screen 402. Thus, the set of possible entities can include any data that is being displayed by the electronic device to better understand the user's intent based on input 401.

In particular, reference resolution service 204 scrapes any data being displayed on a screen of the electronic device including text, images, videos, etc. and categorizes the data to determine the set of possible entities. Reference resolution service 204 may then determine which of this data is relevant based on the data and determined categorizations such as phone number, address, business, person, etc. and a determined salience (e.g., relevance) score as discussed further below.

In some examples, the set of possible entities includes entities extracted from an application of the electronic device. For example, the set of possible entities can include contacts who the user has recently received a text message or e-mail from, songs the user has recently listened to, websites the user has visited, or addresses the user has requested directions to. Thus, when the user receives text message 503 from "John," as shown in FIG. 5, the set of possible entities can include John so that when input 501 of "call him" is received, digital assistant 200 will consider that "him" may be referring to John.

In some examples, entities extracted from an application of the electronic device are extracted from an application that is not being displayed on a screen of the electronic device. For example, the user may close the text messaging application after sending the response message 504 to John and return to the home screen before providing input 501 of "call him." Accordingly, prior to receiving input 501 or in response to receiving input 501, as discussed further below, reference resolution service 204 can determine that the set of possible entities includes "John," even though the text messaging conversation is no longer displayed on screen 502. In this way, reference resolution service 204 may retrieve possible entities from many different sources, including those that are not being displayed, to develop a more complete understanding of the user's activities and who or what the user may be referring to.

In some examples, the set of possible entities includes entities extracted from a notification. For example, when electronic device 500 receives text message 503, electronic device 500 may provide a notification without displaying the full text message. Accordingly, reference resolution service 204 can extract "John" as an entity from that notification for use in determining who the user is referring to when providing the input 501 of "call him."

In some examples, the set of possible entities includes one or more objects of the application. For example, when the application is a phone book or contacts application as shown in FIG. 3, the set of possible entities may include any of objects 303, 304, 305, 306, or 307 that are displayed as part of the phone book/contacts application. As another example, when the application is a virtual furniture application as shown in FIG. 4, the set of possible entities may include objects 602 and 603 displayed by the virtual furniture application.

In some examples, reference resolution service 204 determines an entity of the set of possible entities by determining a gaze of a user and determining one or more entities based on the gaze of the user. For example, when a user looks towards virtual painting 602 created by electronic device 600, reference resolution service 204 may determine that virtual painting 602 should be an entity of the set of possible entities. As another example, when a user look towards the contact 305 for Keith, reference resolution service 204 may determine that contact 305 should be an entity of the set of possible entities.

In some examples, reference resolution service 204 determines an entity of the set of possible entities by determining a gesture of the user and determining one or more entities based on the gesture of the user. For example, the user may point or nod at virtual couch 603 and reference resolution service 204 may then determine that the virtual couch 603 is an entity of the set of possible entities based on the user pointing at the virtual couch 603.

In some examples, reference resolution service 204 determines an entity of the set of possible entities by retrieving a previous interaction between the user and the digital assistant. For example, reference resolution service 204 may retrieve interactions between the user and digital assistant 200 that occurred within the last hour, several hours, day, several days, etc. Further, reference resolution service 204 can determine a user input provided during the previous interaction. For example, reference resolution service 204 may determine that the user asked digital assistant 200 "make the couch blue" in a previous interaction that occurred the day before the current interaction. Reference resolution service 204 may also determine an output provided by digital assistant 200 during the previous interaction. For example, reference resolution service 204 may determine that the digital assistant 200 changed a color property of the couch to blue in response to the user input.

Reference resolution service 204 may then determine one or more entities of the set of possible entities based on the user input and the output provided by the digital assistant. For example, based on the previous interaction discussed above, reference resolution service 204 may determine that the set of possible entities includes virtual couch 603 as well as a color property of virtual couch 603. Accordingly, reference resolution service 204 may utilize the interaction history between the user and digital assistant 200 to determine possible entities that the user may reference.

In some examples, reference resolution service 204 determines the set of possible entities before invocation of digital assistant 200. For example, reference resolution service 204 can determine that the set of possible entities includes the contacts application and objects 303 and 304 prior to receiving user utterance 301. In some examples, reference resolution service 204 determines the set of possible entities concurrently with the invocation of digital assistant 200. For example, reference resolution service 204 can determine the set of possible entities while receiving an input including the trigger phrase "Hey Siri." In some examples, reference resolution service 204 determines the set of possible entities after invocation of digital assistant 200. For example, reference resolution service 204 may determine the set of possible entities after determining that user utterance 301 is directed to digital assistant 200 in order to determine what entity "him" is referring too.

Accordingly, reference resolution service 204 may determine and update the set of possible entities in real time so that an updated list of possible entities is ready to be processed as discussed further below whenever digital assistant 200 is invoked and a user utterance is received.

Digital assistant 200 also receives user utterance 203 including an ambiguous reference. An ambiguous reference is a word or phrase that ambiguously references something like an object, time, person, or place. Exemplary ambiguous references include but are not limited to "that," "this," "here," "there," "then," "those," "them," "he," "she," "it," etc. especially when used in the inputs "call him," "move that one," and "who is he?" Accordingly, input analyzer 202 may determine whether user utterance 203 includes one of these words or words like them and thus, whether the use of the word is ambiguous.

For example, in the spoken input "call him" input analyzer 202 may determine that "him" is an ambiguous reference. Similarly, in spoken input 201 "move that one" input analyzer 202 determines that "one" is an ambiguous reference. In both examples, input analyzer 202 may determine "him" and "one" to be ambiguous because the user input does not include a subject or object that could be referred to with "him" or "one." In some examples, NLP module 206 may determine whether user utterance 203 includes an ambiguous reference independently or with the help of input analyzer 202.

After digital assistant 200 receives user utterance 203 including the ambiguous reference, digital assistant 200 provides user utterance 203 to NLP module 206 to determine a candidate interpretation. In particular, NLP module 206 determines, based on user utterance 203 and list of possible entities 205, candidate interpretation 207 including a preliminary set of entities corresponding to the ambiguous reference.

In some examples, NLP module 206 determines candidate interpretations, including candidate interpretation 207 through semantic analysis. In some examples, performing the semantic analysis includes performing automatic speech recognition (ASR) on user utterance 203. In particular, NLP module 206 can include one or more ASR systems that process user utterance 203 received through input devices (e.g., a microphone) of electronic device 100. The ASR systems extract representative features from the speech input. For example, the ASR systems pre-processor performs a Fourier transform on the user utterance 203 to extract spectral features that characterize the speech input as a sequence of representative multi-dimensional vectors.

Further, each ASR system of NLP module 206 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognition results (e.g., phonemes, phonemic strings, and sub-words), and ultimately, text recognition results (e.g., words, word strings, or sequence of tokens).

In some examples, performing semantic analysis includes performing natural language processing on user utterance 203. In particular, once NLP module 206 produces recognition results containing a text string (e.g., words, or sequence of words, or sequence of tokens) through ASR, NLP module 206 may deduce an intent of user utterance 203. In some examples, NLP module 206 produces multiple candidate text representations of the speech input, as discussed further below. Each candidate text representation is a sequence of words or tokens corresponding to user utterance 203. In some examples, each candidate text representation is associated with a speech recognition confidence score. Based on the speech recognition confidence scores, input analyzer 202 ranks the candidate text representations and provides the n-best (e.g., n highest ranked) candidate text representation(s) to other modules of digital assistant 200 for further processing.

In some examples, NLP module 206 determines candidate interpretation 207 by determining a plurality of possible candidate interpretations. For example, NLP module 206 may determine the plurality of possible candidate interpretations "call them," "fall him," and "tall him," based on user utterance 301 of "call him." Further, NLP module 206 determines whether a possible candidate interpretation is compatible with an entity from list of possible entities 205. For example, NLP module 206 may compare the candidate interpretations "call them," "fall him," and "tall him," to the entities 303 and 304 which are contacts in the contacts applications. Accordingly, NLP module 206 may determine that the candidate interpretations "fall him" and "tall him" are not compatible because contacts 303 and 304 do not have any properties or actions related to the words "fall" or "tall."

In some examples, the preliminary set of entities from the list of possible entities are selected based on NLP Module 206's determination of whether possible candidate interpretations are compatible with the entities of the list of possible entities 205. For example, if a possible candidate interpretation is not compatible with any of the entities of the list of possible entities 206, NLP module 206 may disregard the entity. In some examples, NLP module 206 adds an entity to the preliminary set of entities when a threshold number of candidate interpretations are compatible with the entity. For example, entity 303 representing the contact John may be added to the preliminary set of entities when two or more candidate interpretations (e.g., call them and call him) are compatible with entity 303. The threshold may be any number of candidate interpretations such as 2, 3, 4, 6, 10, 12, etc.

Further, NLP module 206 may disregard the entities that are not compatible with a threshold number of candidate interpretations. For example, entity 602 may be disregarded because it is not compatible with any of the candidate interpretations or is only compatible with one of the candidate interpretations. In particular, if an entity is not able to perform an task determined based on the candidate interpretation or does not have a property that can be affected by the task determined based on the candidate interpretation then the entity is determined to be not compatible with the candidate interpretation.

Similarly, NLP module 206 selects a candidate interpretation based on the determination of whether possible candidate interpretations are compatible with the entities of the list of possible entities 205. In some examples, NLP module 206 selects the candidate interpretation when a threshold number of entities are compatible with the candidate interpretation. For example, the candidate interpretation "call him" may be selected when it is compatible with two or more of the entities in the list of possible entities 205. Further, NLP module 206 may disregard candidate interpretations that are not compatible with a threshold number of entities from the list of possible entities. For example, the candidate interpretation "tall him" may be disregarded because it is not compatible with any of the entities from the list of possible entities 205 or is only compatible with one of the entities from the list of possible entities 205.

In some examples, NLP module 206 repeats this process for each of the entities from list of possible entities 205 and for each candidate interpretation. In this way, NLP module 206 can determine one or more candidate interpretations that are likely to reference the preliminary set of entities.

In some examples, NLP module 206 determines candidate interpretation 207 by determining a salience score associated with each possible candidate interpretation of a list of possible candidate interpretations. For example, In some examples, the salience score is determine based on factors like how many entities a candidate interpretation is compatible with, how similar the candidate interpretation is to user utterance 203, whether a candidate interpretation was determined multiple times (e.g., by different components of NLP module 206), etc. In some examples, the salience score is based on a speech recognition confidence score. Based on the salience scores, NLP module 206 ranks the possible candidate interpretations and provides the n-best (e.g., n highest ranked) candidate interpretation(s) to other modules of digital assistant 200 for further processing. In some examples, NLP module 206 selects the highest ranked possible candidate interpretation as the candidate interpretation and provides it to reference resolution service 204.

In some examples, NLP module 206 is associated with an application of electronic device 100. For example, NLP module 206 may be associated with a virtual furniture application of electronic device 600 that created virtual objects 602 and 603. Accordingly, NLP module 206 may determine the candidate interpretation and the preliminary set of entities based on entities of the application associated with NLP module 206. For example, NLP module 206 may determine that virtual objects 602 and 603 as entities of the preliminary set of entities because NLP module 206 is associated with the virtual furniture application. Further, NLP module 206 may determine that the candidate interpretation is "move that one" rather than a different candidate interpretation because the action "move" is compatible with virtual objects 602 and 603 or properties of virtual objects 602 and 603 (e.g., location).

In some examples, NLP module 206 is associated with digital assistant 200 and thus may determine the candidate interpretation and the preliminary set of entities based on entities associated with many different applications of electronic device 100. For example, NLP module 206 may determine candidate interpretations including "move that one," "groove that one," and "move that young," based on the virtual furniture application, as well as other applications of electronic device 600 such as a music playing application or a video game application. Moreover, NLP module 206 may determine that the preliminary set of entities includes virtual objects 602 and 603, as well as songs of a playlist, and objects in a video game associated with each of the applications of electronic device 600.

In some examples, digital assistant 200 may include a plurality of NLP modules 206 that are each associated with different applications of the electronic device 100. Accordingly, each of the NLP modules associated with each of the applications determines a candidate interpretation including a preliminary set of entities that is provided to reference resolution service 204 for further processing. For example, a first NLP module 206 associated with the virtual furniture application can determine the candidate interpretation "move that one" and that objects 602 and 603 are a preliminary set of entities while a second NLP module 206 associated with a music playing application can determine the candidate interpretation "groove that one" and several different songs as a preliminary set of entities. This may be repeated for any number of different NLP modules 206 associated with the different applications of electronic device 100.

Once reference resolution service 204 receives candidate interpretation 207, reference resolution service 204 determines entity 209 corresponding to the ambiguous reference of user utterance 203. In some examples, reference resolution service 204 selects entity 209 from the preliminary set of entities received with candidate interpretation 207. For example, when the preliminary set of entities includes objects 602 and 603 reference resolution service 204 may select one of objects 602 and 603 as entity 209.

In some examples, reference resolution service 204 determines a salience score for each entity of the preliminary set of entities and ranks the preliminary set of entities based on the corresponding salience scores. For example, reference resolution service 204 may determine a first salience score associated with object 602 and a second salience score associated with object 603 that is higher than the first salience score. Accordingly, reference resolution service 204 may rank object 603 over object 602 based on the corresponding salience scores.

As another example, reference resolution service 204 may determine a salience score for the restaurant name 403 and the address 405 when an input of "go there," is received. Accordingly, while both restaurant name 403 and address 405 are valid entities for "there" because address 405 can be directly put into a navigation application without any other processing to determine where it is, address 405 may be assigned a higher salience score and, as described further below, selected. In this way, reference resolution service 204 considers all of the entities and possible candidate interpretations to best determine how to execute a task derived from the user's intent.

In some examples, salience scores determined by reference resolution service 204 for each entity of the preliminary set of entities are based on applications open on electronic device 100. For example, reference resolution service 204 may determine salience scores only for entities associated with the applications open on electronic device 100. As another example, reference resolution service 204 may determine higher salience scores for entities associated with applications open on electronic device 100 compared to entities associated with applications that are closed on electronic device 100. In some examples, salience scores determined by reference resolution service 204 for each entity of the preliminary set of entities are based on objects displayed by an application of electronic device 100. For example, reference resolution service 204 may determine higher salience scores for entities associated with objects displayed by an application (e.g., virtual objects 602 and 603) as compared to objects that are not actively being displayed.

In some examples, salience scores determined by reference resolution service 204 for each entity of the preliminary set of entities are based on a user gaze detected by digital assistant 200. For example, when digital assistant 200 detects a user gaze towards entity 304, reference resolution service 204 determines a salience score for entity 304 that is higher than salience scores for entity 305, 306, etc. In some examples, salience scores determined by reference resolution service 204 for each entity of the preliminary set of entities are based on a user gesture detected by digital assistant 200. For example, when digital assistant 200 detects a user pointing or nodding towards virtual object 603, reference resolution service 204 determines a salience score for virtual object 603 that is higher than salience scores for virtual object 602 or any other entities.

As another example, when a user gaze is detected towards a particular portion of a screen of the electronic device, reference resolution service 204 may determine a higher salience score for entities located in that portion of the screen. For example, if several different photographs are being displayed on the screen of the electronic device, reference resolution service 204 may calculate the highest salience score for the photograph (e.g., the entity) that the user is actively looking at and thus, when the user provides the input "share this," selects that photograph.

In some examples, salience scores determined by reference resolution service 204 for each entity of the preliminary set of entities are based on previous interactions between the user and digital assistant 200. In particular, the salience scores may be based on an input provided by the user during a previous interaction. For example, when a user has previously provided the input "what's Kelsey's number?" reference resolution service 204 may determine a salience score for entity 306 that is higher than salience scores for entities 303, 304, etc. Similarly, the salience scores may be based on an output provided by digital assistant 200 to the user in response to an input. For example, when digital assistant 200 has previously provided the output "the couch is green," reference resolution service 204 may determine a salience score for virtual object 603 that is higher than salience scores for virtual object 602 or other entities.

As another example, when the electronic device provides notifications, reference resolution service 204 may determine salience scores for entities extracted from each of the notifications. Accordingly, reference resolution service 204 may determine higher salience scores for entities that are extracted from multiple notifications or are extracted from notifications and appear in previous interactions between the user and digital assistant 200.

In some examples, salience scores determined by reference resolution service 204 for each entity of the preliminary set of entities are based on the candidate interpretation. For example, when the candidate interpretation is "call him" reference resolution service 204 may determine salience scores for entities 303, 304, and 305 that are higher than salience scores for entities 306 and 307 because "him" refers to a male name like John, Josh, or Keith.

After ranking the preliminary set of entities based on the corresponding salience scores, reference resolution service 204 selects the entity with the highest corresponding salience score as entity 209 corresponding to the ambiguous reference.

In some examples, the salience scores for each entity of the preliminary set of entities are determined by an NLP module 206 associated with an application that determines candidate interpretation 207. For example, when NLP module 206 associated with the virtual furniture application determines the candidate interpretation "move that one" NLP module 206 may also determine the salience scores for virtual objects 602 and 603 (e.g., based on user gaze, gesture, past interaction history, etc.)

This process may be repeated for each NLP module 206 associated with each application that determines a candidate interpretation and provides the candidate interpretations 207 to reference resolution service 204. For example, in addition to the determination made by NLP module 206 associated with the virtual furniture application another NLP module 206 associated with a music playing application may determine salience scores associated with different songs along with the candidate interpretation "groove that one."

In some examples, reference resolution service 204 selects an application and the NLP module 206 associated with the application based on an entity identification associated with an entity of the preliminary set of entities. In some examples, the entity identification is received from the NLP module 206 with candidate interpretation 207. For example, virtual object 603 may be associated with an entity identification such as "virt_couch_1" that may be passed to reference resolution service 204 along with virtual object 603 in the preliminary set of entities. Accordingly, reference resolution service 204 may recognize that this entity identification is associated with the virtual furniture application and select the virtual furniture application to determine salience scores or perform other processing.

In some examples, the entity identification is determined by digital assistant 200 based on an object displayed by the application. For example, because the virtual furniture application is displaying virtual object 603, digital assistant 200 may query the virtual furniture application to determine that the entity identification associated with virtual object 603 is "virt_couch_1." In some examples, the entity identification is determined by digital assistant 200 based on an object that the user has interacted with. For example, once a user gestures towards or taps on virtual object 602, digital assistant 200 may query the virtual furniture application to determine that the entity identification associated with virtual object 602 is "virt_paint_1."

In some examples, digital assistant 200 determines an object that the user has interacted with based on a gaze of the user. For example, digital assistant 200 may determine that the entity identification for entity 305 needs to be determined because the user has looked at entity 305 recently. In some examples, digital assistant 200 determines an object that the user has interacted with based on a gesture of the user. For example, digital assistant 200 may determine that the entity identification for entity 303 needs to be determined because the user has pointed at or tapped on entity 303 recently.

In some examples, digital assistant 200 determines an object that the user has interacted with based on previous interactions with digital assistant 200. For example, digital assistant 200 may determine that the entity identification for virtual object 603 needs to be determined because the user has previously asked for details about virtual object 603 and digital assistant 200 has provided a spoken output related to virtual object 603.

In some examples, reference resolution service 204 determines a second entity 209 corresponding to the ambiguous reference based on candidate interpretation 207 including the preliminary set of entities. For example, reference resolution service 204 may determine that both virtual object 602 and virtual object 603 could be entities referred to by the utterance 601 of "move that one" because the salience scores associated with virtual objects 602 and 603 are the same or close to the same and are ranked the highest.

In some examples, when reference resolution service 204 determines two or more entities, digital assistant 200 provides a prompt for the user to choose one of the two or more entities. In some examples, the prompt is provided in a user interface associated with digital assistant 200. For example, digital assistant 200 may provide an interface or affordance including the question "which object would you like to move?" with the options of "couch" and "painting" along with virtual objects 602 and 603. In some examples, the prompt is provided as a spoken output by digital assistant 200. For example, digital assistant 200 may provide an audio output including the question "which object would you like to move?" with the options of "couch" and "painting."

In some examples, digital assistant 200 receives a selection of one of the entities from the user and stores the selected entity as corresponding to the ambiguous reference of user utterance 203 with reference resolution service 204. For example, after providing the output with the options "couch" and "painting," digital assistant 200 may receive a selection from the user of "couch" and store the association between the term "that one" and "couch" in a database or other storage of reference resolution service 204.

In some examples, the selection is a spoken input received by digital assistant 200. For example, the user may provide the spoken input "couch" or "move the couch" indicating selection of virtual object 603. In some examples, the selection is a gesture towards one of the provided entities. For example, the user may point or nod towards virtual object 603 to indicate selection of virtual object 603. In some examples, the selection is a gesture such as a tap or poke on a prompt provided on a touch sensitive screen of electronic device 100. For example, when digital assistant 200 provides affordances corresponding to the options of "couch" and "painting," the user may tap on the affordance corresponding to "couch" as a selection.

In some examples, digital assistant 200 receives another user utterance including the same ambiguous reference after storing the selected entity as corresponding to the ambiguous reference. For example, digital assistant 200 may receive the second utterance "now move that one over there," after storing the previous selection. When digital assistant 200 receives another user utterance including the same ambiguous reference, reference resolution service 204 accesses the stored selected entity and determines that the ambiguous reference refers to the stored selected entity. Thus, after receiving the second utterance "now move that one over there," reference resolution service 204 accesses the stored selected entity to determine "that one" means to move virtual object 603.

After reference resolution service 204 determines entity 209, digital assistant 200 provides entity to task execution module 208. Task execution module 208 may then interact with application execution interface 210 to perform a task associated with the user utterance using entity 209. For example, after determining that "move that one" is referring to virtual object 603, task execution module 208 may interact with an application execution interface for the virtual furniture application to cause virtual object 603 to move. In some examples, task execution module 208 calls a task of application execution interface 210 associated with an application. In some examples, the application associated with application execution interface 210 is the same application associated with NLP module 206. For example, digital assistant 200 may determine that the virtual furniture application should be accessed based on the results provided from the NLP module 206 associated with the virtual furniture application previously.

In some examples, after task execution module 208 performs the task, digital assistant 200 provides a result of the task. In some examples, the result of the task is provided in a user interface associated with digital assistant 200. For example, digital assistant 200 may move virtual object 603 or provide a user interface showing a call placed to the person associated with entity 305. In some examples, the result of the task is provided as an audio output. For example, digital assistant 200 may provide the audio output "calling Keith" after entity 305 is determined as the entity and the task of calling Keith is started.

In some examples, the task associated with the user utterance is based on the candidate interpretation and the entity corresponding to the ambiguous reference. For example, digital assistant 200 may call Keith based on the candidate interpretation "call him" and a determination that entity 305 is what "him" refers to.

It should be understood that this process could be repeated for any number of user utterances including any number of different ambiguous references to determine what entity the user utterance is referring to. Accordingly, digital assistant 200 may more efficiently understand user utterances and execute tasks, reducing the need to interact with the user repeatedly and thus reducing power consumption and increasing the battery life of electronic device 100.

FIG. 5 is a flow diagram illustrating a method for resolving an ambiguous reference of a user utterance, according to various examples. Method 700 is performed at a device (e.g., device 100, 300, 600) with one or more input devices (e.g., a touchscreen, a mic, a camera), and a wireless communication radio (e.g., a Bluetooth connection, WiFi connection, a mobile broadband connection such as a 4G LTE connection). In some embodiments, the electronic device includes a plurality of cameras. In some examples, the device includes one or more biometric sensors which, optionally, include a camera, such as an infrared camera, a thermographic camera, or a combination thereof. Some operations in method 700 are, optionally, combined, the orders of some operations are, optionally, changed, and some operations are, optionally, omitted.

At block 702 an invocation of a digital assistant (e.g., digital assistant 200, 310, and 610) is detected. In some examples, invocation of the digital assistant is detected before the receipt of a user utterance (e.g., user utterance 203, 301, 601). In some examples, detecting invocation of the digital assistant includes receiving a first user utterance (e.g., user utterance 203, 301, 601), determining whether the first user utterance includes one or more words for invoking the digital assistant, and in accordance with a determination that the first user utterance includes one or more words for invoking the digital assistant, providing an indication that the digital assistant is active. In some examples, the first user utterance and a second user utterance are received as part of a single speech input.

At block 704, a set of possible entities (e.g., set of entities 205) is determined using a reference resolution service (e.g., reference resolution service 204). In some examples, the set of possible entities includes an application displayed in a user interface of the electronic device (e.g., electronic device 100, 300, 600). In some examples, the set of possible entities includes an object (e.g., entities 303, 304, 305, 306, 307, objects 602, 603) of the application displayed in the user interface of the electronic device.

In some examples, determining, using the reference resolution service (e.g., reference resolution service 204), the set of possible entities (e.g., set of entities 205) includes determining a gaze of a user and determining one or more entities (e.g., entities 303, 304, 305, 306, 307, objects 602, 603) based on the gaze of the user. In some examples, determining, using the reference resolution service, the set of possible entities includes determining a gesture of the user and determining one or more entities based on the gesture of the user. In some examples, determining, using the reference resolution service, the set of possible entities includes retrieving a previous interaction between the user and the digital assistant (e.g., digital assistant 200, 310, 610), determining a user input provided during the previous interaction, determining an output provided by the digital assistant during the previous interaction, and determining one or more entities based on the user input and the output provided by the digital assistant.

At block 706, a user utterance (e.g., user utterance 203, 310, 610) including an ambiguous reference is received.

At block 708, a candidate interpretation (e.g., candidate interpretation 207) including a preliminary set of entities corresponding to the ambiguous reference is determined based on the user utterance (e.g., user utterance 203, 310, and 610) and the set of possible entities (e.g., set of entities 205). In some examples, determining, based on the user utterance and the list of possible entities, the candidate interpretation including the preliminary set of entities corresponding to the ambiguous reference includes determining a plurality of possible candidate interpretations, determining whether a possible candidate interpretations of the plurality of possible candidate interpretations is compatible with an entity (e.g., entities 303, 304, 305, 306, 307, objects 602, 603) of the list of possible entities; and in accordance with a determination that the possible candidate interpretation of the plurality of possible candidate interpretations is not compatible with the entity of the list of possible entities, disregarding the possible candidate interpretation.

In some examples, each of the possible candidate interpretations is associated with a salience score and determining, based on the user utterance (e.g., user utterance 203, 310, and 610) and the set of possible entities (e.g., set of entities 205), the candidate interpretation (e.g., candidate interpretation 207) including the preliminary set of entities corresponding to the ambiguous reference includes, determining a list of possible candidate interpretations that are compatible with the list of possible entities, ranking the list of possible candidate interpretations based on the associated salience scores, and selecting the highest ranked possible candidate interpretation as the candidate interpretation. In some examples, the candidate interpretation is determined by a natural language model (e.g., NLP module 206) associated with an application of the electronic device (e.g., electronic device 100, 300, 600).

At block 710, an entity (e.g., entities 303, 304, 305, 306, 307, objects 602, 603) corresponding to the ambiguous reference is determined with the reference resolution service and (e.g., reference resolution service 204) based on the candidate interpretations (e.g., candidate interpretation 207) including the preliminary set of entities corresponding to the ambiguous reference. In some examples, determining, with the reference resolution service and based on the candidate interpretation including the preliminary set of entities corresponding to the ambiguous reference, an entity corresponding to the ambiguous reference includes determining a plurality of salience scores corresponding to each entity of the preliminary set of entities, ranking the preliminary set of entities based on the corresponding plurality of salience scores, and selecting the entity with the highest corresponding salience score as the entity corresponding to the ambiguous reference. In some examples, determining the plurality of salience scores corresponding to each entity of the preliminary set of entities includes determining, with an application of the electronic device, a first salience score corresponding to a first entity of the preliminary set of entities, and determining, with the application of the electronic device, a second salience score corresponding to a second entity of the preliminary set of entities.

In some examples, the application of the electronic device is an application that determines the candidate interpretation (e.g., candidate interpretation 207). In some examples, the application of the electronic device is selected based on an entity identification associated with the first entity of the preliminary set of entities. In some examples, the entity identification is received from the application with the candidate interpretation. In some examples, the entity identification is determined based on an object that a user has interacted with. In some examples, the object that the user has interacted with is determined based on a gaze of the user. In some examples, the object that the user has interacted with is determined based on a previous interaction with the digital assistant.

In some examples, the entity (e.g., entities 303, 304, 305, 306, 307, objects 602, 603) corresponding to the ambiguous reference is a first entity (e.g., entities 303, 304, 305, 306, 307, objects 602, 603) corresponding to the ambiguous reference. In some examples, a second entity (e.g., entities 303, 304, 305, 306, 307, objects 602, 603) corresponding to the ambiguous reference is determined, with the reference resolution service (reference resolution service 204) and based on the candidate interpretation (e.g., candidate interpretation 207) including the preliminary set of entities corresponding to the ambiguous reference. In some examples, a prompt for the user to choose between the first entity corresponding to the ambiguous reference or the second entity corresponding to the ambiguous reference from the user is provided. In some examples, a selection of the first entity corresponding to the ambiguous reference from the user is received. In some examples, the selection of the first entity corresponding to the ambiguous reference with the reference resolution service is stored.

In some examples, the user utterance (e.g., user utterance 203, 310, and 610) is a first user utterance (e.g., user utterance 203, 310, and 610). In some examples, a second user utterance (e.g., user utterance 203, 310, and 610) including the ambiguous reference is received. In some examples, the first entity corresponding to the ambiguous reference is determined with the reference resolution service (e.g., reference resolution service 204) based on the stored selection of the first entity (e.g., entities 303, 304, 305, 306, 307, objects 602, 603).

At block 712, a task associated with the user utterance (e.g., user utterance 203, 310, and 610) is performed based on the candidate interpretation (e.g., candidate interpretation 207) and the entity (e.g., entities 303, 304, 305, 306, 307, objects 602, 603) corresponding to the ambiguous reference. In some examples, a result of the task associated with the user utterance is provided.

As described above, one aspect of the present technology is the gathering and use of data available from various sources to improve the delivery to users of content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of information delivery services, the present technology can be configured to allow users to select to "opt in" or "opt out" of participation in the collection of personal information data during registration for services or anytime thereafter. In another example, users can select not to provide user information for deliver services. In yet another example, users can select to limit the length of time user information is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A non-transitory computer-readable storage medium storing one or more programs configured to be executed by one or more processors of an electronic device, the one or more programs including instructions for:
   detecting invocation of a digital assistant;
   determining, using a reference resolution service, a set of possible entities prior to receiving a user utterance including an ambiguous reference;
   receiving the user utterance including the ambiguous reference;
   determining, based on the user utterance and the set of possible entities, a plurality of candidate interpretations including a preliminary set of entities corresponding to the ambiguous reference, wherein a first candidate interpretation of the plurality of candidate interpretations is determined by a first natural language model associated with a first application and a second candidate interpretation of the plurality of candidate interpretations is determined by a second natural language model different from the first natural language model and wherein the second natural language model is associated with a second application different from the first application;
   determining, with the reference resolution service and based on the plurality of candidate interpretations including the preliminary set of entities corresponding to the ambiguous reference, an entity corresponding to the ambiguous reference; and
   performing, based on the plurality of candidate interpretations and the entity corresponding to the ambiguous reference, a task associated with the user utterance.

2. The non-transitory computer-readable storage medium of claim 1, wherein detecting invocation of the digital assistant and determining the set of possible entities occur before receipt of the user utterance.

3. The non-transitory computer-readable storage medium of claim 1, wherein the user utterance is a second user utterance and detecting invocation of the digital assistant further comprises:
   receiving a first user utterance, wherein the second user utterance is received after the first user utterance;
   determining whether the first user utterance includes one or more words for invoking the digital assistant; and
   in accordance with a determination that the first user utterance includes one or more words for invoking the digital assistant, providing an indication that the digital assistant is active.

4. The non-transitory computer-readable storage medium of claim 3, wherein the first user utterance and the second user utterance are received as part of a single speech input.

5. The non-transitory computer-readable storage medium of claim 1, wherein the set of possible entities includes an application displayed in a user interface of the electronic device.

6. The non-transitory computer-readable storage medium of claim 5, wherein the set of possible entities includes an object of the application displayed in the user interface of the electronic device.

7. The non-transitory computer-readable storage medium of claim 1, wherein determining, using the reference resolution service, the set of possible entities further comprises:
   determining a gaze of a user; and
   determining one or more entities based on the gaze of the user.

8. The non-transitory computer-readable storage medium of claim 1, wherein determining, using the reference resolution service, the set of possible entities further comprises:
   determining a gesture of a user; and
   determining one or more entities based on the gesture of the user.

9. The non-transitory computer-readable storage medium of claim 1, wherein determining, using the reference resolution service, the set of possible entities prior to receiving the user utterance including the ambiguous reference further comprises:
   retrieving a previous interaction between a user and the digital assistant;
   determining a user input provided during the previous interaction;
   determining an output provided by the digital assistant during the previous interaction; and
   determining one or more entities based on the user input and the output provided by the digital assistant.

10. The non-transitory computer-readable storage medium of claim 9, wherein the retrieved previous interaction between the user and the digital assistant is based on interactions that occurred within a predetermined time period.

11. The non-transitory computer-readable storage medium of claim 10, wherein the predetermined time period is the last hour.

12. The non-transitory computer-readable storage medium of claim 10, wherein the predetermined time period is the last day.

13. The non-transitory computer-readable storage medium of claim 1, wherein determining, based on the user utterance and the set of possible entities, the plurality of candidate interpretations including the preliminary set of entities corresponding to the ambiguous reference further comprises:
   determining a plurality of possible candidate interpretations;
   determining whether a possible candidate interpretation of the plurality of possible candidate interpretations is compatible with an entity of the set of possible entities; and
   in accordance with a determination that the possible candidate interpretation of the plurality of possible candidate interpretations is not compatible with the entity of the set of possible entities, disregarding the possible candidate interpretation.

14. The non-transitory computer-readable storage medium of claim 13, wherein each of the possible candidate interpretations is associated with a salience score and determining, based on the user utterance and the set of possible entities, the plurality of candidate interpretations including the preliminary set of entities corresponding to the ambiguous reference further comprises:
   determining a list of possible candidate interpretations that are compatible with the set of possible entities;
   ranking the list of possible candidate interpretations based on the associated salience scores; and
   selecting the highest ranked possible candidate interpretation as a candidate interpretation of the plurality of candidate interpretations.

15. The non-transitory computer-readable storage medium of claim 1, wherein determining, with the reference resolution service and based on the plurality of candidate interpretations including the preliminary set of entities corresponding to the ambiguous reference, an entity corresponding to the ambiguous reference further comprises:

determining a plurality of salience scores corresponding to each entity of the preliminary set of entities; ranking the preliminary set of entities based on the corresponding plurality of salience scores; an selecting the entity with the highest corresponding salience score as the entity corresponding to the ambiguous reference.

16. The non-transitory computer-readable storage medium of claim 15, wherein determining the plurality of salience scores corresponding to each entity of the preliminary set of entities further comprises:
   determining, with a first application of the electronic device, a first salience score corresponding to a first entity of the preliminary set of entities; and
   determining, with a second application of the electronic device, a second salience score corresponding to a second entity of the preliminary set of entities.

17. The non-transitory computer-readable storage medium of claim 16, wherein:
   the first application of the electronic device is a first application of the respective plurality of different applications; and
   the second application of the electronic device is a second application of the respective plurality of different applications.

18. The non-transitory computer-readable storage medium of claim 16, wherein the first application of the electronic device is selected based on an entity identification associated with the first entity of the preliminary set of entities.

19. The non-transitory computer-readable storage medium of claim 18, wherein the entity identification is received from the first application with the plurality of candidate interpretations.

20. The non-transitory computer-readable storage medium of claim 19, wherein the entity identification is determined based on an object that a user has interacted with.

21. The non-transitory computer-readable storage medium of claim 20, wherein the object that the user has interacted with is determined based on a gaze of the user.

22. The non-transitory computer-readable storage medium of claim 20, wherein the object that the user has interacted with is determined based on a previous interaction with the digital assistant.

23. The non-transitory computer-readable storage medium of claim 1, wherein the entity corresponding to the ambiguous reference is a first entity corresponding to the ambiguous reference and the one or more programs further include instructions for:
   determining, with the reference resolution service and based on the plurality of candidate interpretations including the preliminary set of entities corresponding to the ambiguous reference, a second entity corresponding to the ambiguous reference;
   providing a prompt for a user to choose between the first entity corresponding to the ambiguous reference or the second entity corresponding to the ambiguous reference from the user;
   receiving a selection of the first entity corresponding to the ambiguous reference from the user; and
   storing the selection of the first entity corresponding to the ambiguous reference with the reference resolution service.

24. The non-transitory computer-readable storage medium of claim 23, wherein the user utterance is a first user utterance the one or more programs further include instructions for:
   receiving a second user utterance including the ambiguous reference; and
   determining the first entity corresponding to the ambiguous reference with the reference resolution service based on the stored selection of the first entity.

25. The non-transitory computer-readable storage medium of claim 1, the one or more programs further include instructions for:
   providing a result of the task associated with the user utterance.

26. The non-transitory computer-readable storage medium of claim 1, wherein the plurality of candidate interpretations includes a respective plurality of candidate interpretations of the entire user utterance.

27. The non-transitory computer-readable storage medium of claim 1, wherein the set of possible entities is selected independently of an interaction with the digital assistant.

28. An electronic device comprising:
   one or more processors;
   a memory; and
   one or more programs, wherein the one or more programs are stored in the memory and configured to be executed by the one or more processors, the one or more programs including instructions for:
      detecting invocation of a digital assistant;
      determining, using a reference resolution service, a set of possible entities prior to receiving a user utterance including an ambiguous reference;
      receiving the user utterance including the ambiguous reference;
      determining, based on the user utterance and the set of possible entities, a plurality of candidate interpretations including a preliminary set of entities corresponding to the ambiguous reference, wherein a first candidate interpretation of the plurality of candidate interpretations is determined by a first natural language model associated with a first application and a second candidate interpretation of the plurality of candidate interpretations is determined by a second natural language model different from the first natural language model and wherein the second natural language model is associated with a second application different from the first application;
      determining, with the reference resolution service and based on the plurality of candidate interpretations including the preliminary set of entities corresponding to the ambiguous reference, an entity corresponding to the ambiguous reference; and
      performing, based on the plurality of candidate interpretations and the entity corresponding to the ambiguous reference, a task associated with the user utterance.

29. The electronic device of claim 28, wherein detecting invocation of the digital assistant and determining the set of possible entities occur before receipt of the user utterance.

30. The electronic device of claim 28, wherein the set of possible entities includes an application displayed in a user interface of the electronic device.

31. The electronic device of claim 28, wherein determining, using the reference resolution service, the set of possible entities further comprises:
   determining a gaze of a user; and
   determining one or more entities based on the gaze of the user.

32. The electronic device of claim 28, wherein determining, using the reference resolution service, the set of possible entities further comprises:
   determining a gesture of a user; and
   determining one or more entities based on the gesture of the user.

33. The electronic device of claim 28, wherein determining, using the reference resolution service, the set of possible entities prior to receiving the user utterance including the ambiguous reference further comprises:
   retrieving a previous interaction between a user and the digital assistant;
   determining a user input provided during the previous interaction;
   determining an output provided by the digital assistant during the previous interaction; and
   determining one or more entities based on the user input and the output provided by the digital assistant.

34. The electronic device of claim 28, wherein determining, based on the user utterance and the set of possible entities, the plurality of candidate interpretations including the preliminary set of entities corresponding to the ambiguous reference further comprises:
   determining a plurality of possible candidate interpretations;
   determining whether a possible candidate interpretation of the plurality of possible candidate interpretations is compatible with an entity of the set of possible entities; and
   in accordance with a determination that the possible candidate interpretation of the plurality of possible candidate interpretations is not compatible with the entity of the set of possible entities, disregarding the possible candidate interpretation.

35. The electronic device of claim 28, wherein determining, with the reference resolution service and based on the plurality of candidate interpretations including the preliminary set of entities corresponding to the ambiguous reference, an entity corresponding to the ambiguous reference further comprises: determining a plurality of salience scores corresponding to each entity of the preliminary set of entities; ranking the preliminary set of entities based on the corresponding plurality of salience scores; and selecting an entity with the highest corresponding salience score as the entity corresponding to the ambiguous reference.

36. The electronic device of claim 28, wherein the entity corresponding to the ambiguous reference is a first entity corresponding to the ambiguous reference and the one or more programs further include instructions for:
   determining, with the reference resolution service and based on the plurality of candidate interpretations including the preliminary set of entities corresponding to the ambiguous reference, a second entity corresponding to the ambiguous reference;
   providing a prompt for a user to choose between the first entity corresponding to the ambiguous reference or the second entity corresponding to the ambiguous reference from the user;
   receiving a selection of the first entity corresponding to the ambiguous reference from the user; and
   storing the selection of the first entity corresponding to the ambiguous reference with the reference resolution service.

37. A method, comprising:
   at an electronic device with one or more processors and memory:
      detecting invocation of a digital assistant;
      determining, using a reference resolution service, a set of possible entities prior to receiving a user utterance including an ambiguous reference;
      receiving the user utterance including the ambiguous reference;
      determining, based on the user utterance and the set of possible entities, a plurality of candidate interpretations including a preliminary set of entities corresponding to the ambiguous reference, wherein a first candidate interpretation of the plurality of candidate interpretations is determined by a first natural language model associated with a first application and a second candidate interpretation of the plurality of candidate interpretations is determined by a second natural language model different from the first natural language model and wherein the second natural language model is associated with a second application different from the first application;
      determining, with the reference resolution service and based on the plurality of candidate interpretations including the preliminary set of entities corresponding to the ambiguous reference, an entity corresponding to the ambiguous reference; and
      performing, based on the plurality of candidate interpretation and the entity corresponding to the ambiguous reference, a task associated with the user utterance.

38. The method of claim 37, wherein detecting invocation of the digital assistant and determining the set of possible entities occur before receipt of the user utterance.

39. The method of claim 37, wherein the set of possible entities includes an application displayed in a user interface of the electronic device.

40. The method of claim 37, wherein determining, using the reference resolution service, the set of possible entities further comprises:
   determining a gaze of a user; and
   determining one or more entities based on the gaze of the user.

41. The method of claim 37, wherein determining, using the reference resolution service, the set of possible entities further comprises:
   determining a gesture of a user; and
   determining one or more entities based on the gesture of the user.

42. The method of claim 37, wherein determining, using the reference resolution service, the set of possible entities prior to receiving the user utterance including the ambiguous reference further comprises:
   retrieving a previous interaction between a user and the digital assistant;
   determining a user input provided during the previous interaction;
   determining an output provided by the digital assistant during the previous interaction; and
   determining one or more entities based on the user input and the output provided by the digital assistant.

43. The method of claim 37, wherein determining, based on the user utterance and the set of possible entities, the plurality of candidate interpretations including the preliminary set of entities corresponding to the ambiguous reference further comprises:
   determining a plurality of possible candidate interpretations;

determining whether a possible candidate interpretation of the plurality of possible candidate interpretations is compatible with an entity of the set of possible entities; and in accordance with a determination that the possible candidate interpretation of the plurality of possible candidate interpretations is not compatible with the entity of the set of possible entities, disregarding the possible candidate interpretation.

44. The method of claim 37, wherein determining, with the reference resolution service and based on the plurality of candidate interpretations including the preliminary set of entities corresponding to the ambiguous reference, an entity corresponding to the ambiguous reference further comprises: determining a plurality of salience scores corresponding to each entity of the preliminary set of entities; ranking the preliminary set of entities based on the corresponding plurality of salience scores; and selecting an entity with the highest corresponding salience score as the entity corresponding to the ambiguous reference.

45. The method of claim 37, wherein the entity corresponding to the ambiguous reference is a first entity corresponding to the ambiguous reference and the method further comprises:

determining, with the reference resolution service and based on the plurality of candidate interpretations including the preliminary set of entities corresponding to the ambiguous reference, a second entity corresponding to the ambiguous reference;

providing a prompt for a user to choose between the first entity corresponding to the ambiguous reference or the second entity corresponding to the ambiguous reference from the user;

receiving a selection of the first entity corresponding to the ambiguous reference from the user; and storing the selection of the first entity corresponding to the ambiguous reference with the reference resolution service.

* * * * *